United States Patent
Toimela et al.

(10) Patent No.: US 10,888,968 B2
(45) Date of Patent: Jan. 12, 2021

(54) MILLING MACHINE CALIBRATION METHOD, AND ARTICLE OF MANUFACTURE

(71) Applicant: D4D Technologies, LLC, Richardson, TX (US)

(72) Inventors: Lasse H. Toimela, Plano, TX (US); Rod A. Duncan, Lucas, TX (US)

(73) Assignee: D4D Technologies, LLC, Richardson, TX (US)

( * ) Notice: Subject to any disclaimer, the term of this patent is extended or adjusted under 35 U.S.C. 154(b) by 119 days.

(21) Appl. No.: 16/117,040

(22) Filed: Aug. 30, 2018

(65) Prior Publication Data

US 2020/0070296 A1    Mar. 5, 2020

(51) Int. Cl.
    *B23Q 17/20*      (2006.01)
    *B23Q 17/22*      (2006.01)

(52) U.S. Cl.
    CPC ......... *B23Q 17/2233* (2013.01); *B23Q 17/20* (2013.01); *B23Q 2717/006* (2013.01)

(58) Field of Classification Search
CPC .................................................. B23Q 17/2233
USPC .................................. 33/636, 638, 639, 642
See application file for complete search history.

(56) References Cited

U.S. PATENT DOCUMENTS

| | | | | |
|---|---|---|---|---|
| 3,704,684 A * | 12/1972 | Brown | .................. | B23Q 17/22 116/230 |
| 4,930,954 A * | 6/1990 | Dague | ................ | B23Q 11/1084 248/229.16 |
| 5,313,410 A * | 5/1994 | Watts | ................... | G01B 21/042 33/503 |
| 6,023,850 A * | 2/2000 | Trapet | .................. | G01B 21/042 33/502 |
| 6,044,308 A | 3/2000 | Huissoon | | |
| 6,138,726 A * | 10/2000 | Newman | ................ | B23Q 3/007 144/144.1 |
| 2008/0178486 A1 * | 7/2008 | Pattee | ................ | B23Q 17/2233 33/640 |
| 2009/0260239 A1 * | 10/2009 | Cerwin | ................ | B23B 49/006 33/286 |
| 2012/0239181 A1 | 9/2012 | Gu et al. | | |

(Continued)

OTHER PUBLICATIONS

International Search Report and Written Opinion, PCT/US2019/049070, dated Jan. 3, 2020.

*Primary Examiner* — George B Bennett
(74) *Attorney, Agent, or Firm* — David H. Judson

(57) ABSTRACT

A milling machine calibration technique, and article of manufacture are described. The article comprises a calibration fixture, together with a calibration pin. The calibration fixture preferably is shaped as a cube, and each of the side faces of the cube comprise a set of indentations (dimples or features) that are configured in a predetermined pattern. A preferred pattern is a "5-dimple" pattern. To find a mapping between axis coordinates (of a mill spindle) and the mill mandrel at some orientation, the calibration fixture is inserted into the mandrel, and the calibration pin is inserted into a collet. Using an x-axis directional position error-based probing mechanism, the system then registers the exact position of each of the five (5) dimples on the surface of the die. Using the positional information so determined, spindle-mandrel spatial relationships for one or more orientations of the mandrel are then identified for calibration purposes.

12 Claims, 4 Drawing Sheets

(56) References Cited

U.S. PATENT DOCUMENTS

| | | | | |
|---|---|---|---|---|
| 2014/0157610 A1* | 6/2014 | Garvey | ................ | G05B 19/401 |
| | | | | 33/503 |
| 2015/0314412 A1* | 11/2015 | Gordon | ............. | B23Q 17/2266 |
| | | | | 33/379 |
| 2015/0367465 A1* | 12/2015 | Gordon | .................. | B23Q 17/22 |
| | | | | 409/225 |

* cited by examiner

MILLING MACHINE CALIBRATION METHOD, AND ARTICLE OF MANUFACTURE

BACKGROUND OF THE INVENTION

Technical Field

This disclosure relates generally to computer-assisted techniques for creating dental restorations.

Brief Description of the Related Art

It is known to provide an intra-oral scanner to enable a user to scan dental patients intra-orally. Such devices are used in a standalone scanner, or as part of a computer-aided design and manufacture (CAD/CAM) system. A CAD/CAM system typically uses dental CAD software executing on a laptop or desktop machine, optionally together with specialized milling machine hardware driven by machine control CAM software. The dentist first prepares a patient's damaged tooth anatomy (using standardized dental practices) to receive a dental restoration including, but not limited to, an inlay, an onlay, a veneer, a crown or a bridge. Once the preparation has been made, the dentist uses the scanner described and illustrated herein to capture a digital impression of a patient's dental anatomy. Once the digital impression has been captured the dentist is presented with an "initial proposal" restoration by the automated CAD software. This initial proposal preferably automatically selects an appropriate tooth anatomy, and it sizes it to fit onto the preparation and within the patient's existing "good" anatomy. This initial proposal is then customized by the dental professional, typically using specialized software tools to adjust and modify the design, with the goal of ultimately achieving an optimized design that fits into the patient's anatomy. Once the final 3D model of the tooth has been achieved, it is sent electronically to a milling machine, which then generates the actual restoration from the design.

A milling machine is characterized by a robust and sturdy frame that minimizes any vibration. This helps ensure the highest quality end product. In a typical machine of this type, the spindles that rotate the milling bits are located on a common rail, thereby providing the device the ability to move the tools in the x-axis. A blank to be milled is attached to a mandrel, and the mandrel is secured to a subassembly that allows motion in the y-axis and the z-axis. The tools may also be manipulated in the y-axis or z-axis while the blank is manipulated in the other axes. The milling machine includes a processor (e.g., a CPU) and memory for storing data on the contour of the crown or inlay to be milled.

Milling machines of this type are configured and managed through a software layer that provides various functions, such as observing the status of the mill, executing commands in the control system, reporting errors, and so forth. The primary function of the mill, however, is to mill blocks according to user-provided tool paths. To successfully execute a tool path, all spindle-mandrel spatial relationships required by the tool path need to be calibrated to the highest degree of accuracy.

While existing mill systems as described provide satisfactory results, there remains a need for improvements in mill calibration speed and accuracy.

BRIEF SUMMARY

An improved milling machine calibration technique is provided. As will be described, the technique utilizes an article of manufacture comprising a calibration fixture, together with a calibration pin. The calibration fixture preferably is shaped as a cube, and each of the side faces of the cube comprise a set of indentations (dimples or features) that are configured in a predetermined pattern. A preferred (but non-limiting) pattern is a "5-dimple" pattern, with each dimple precision-milled to a fixed depth in a conical shape. The calibration pin 504 has an elongated configuration that terminates in a hemispherical tip. To find a mapping between axis coordinates (of the spindle) and the mandrel at some orientation, the calibration fixture is inserted into the mandrel, and the calibration pin is inserted into a collet. Using an x-axis directional position error-based probing mechanism, the system then registers the position of each of the dimples on the surface of the die. In one embodiment, there are five (5) dimples per face, although this is not a limitation. In one type of registration operation, the calibration pin is moved slowly against the calibration fixture. As the calibration pin is moving towards the fixture, a positional error is observed within the mill control system. When the calibration pin is touching the fixture and cannot move forward the positional error starts to rapidly increase, and a fixed threshold is used to signal a touch point. This point is reported as a contact point for the dimple. Preferably, the probing operation utilizes a gradient descent method to find the deepest point of the feature being probed. After the positions of all die features have been found in this manner, the surface of the calibration fixture is approximated, preferably by probing locations on the surface of the fixture and fitting a plane using orthogonal least squares regression. In particular, and after the calibration fixture features have been determined, a set of transformations are then generated as follows. In particular, the found features are registered in a least squares optimal way to respective reference positions, preferably using a Singular Value Decomposition (SVD)-based point set rigid registration method. The resulting transformations are then used to move from mandrel to spindle axis coordinate system coordinates at different mandrel-spindle configurations.

Thus, according to this disclosure, and using the calibration tools, known locations of a feature in the mill are registered, and those locations are then mapped to a shared reference coordinate system.

The foregoing has outlined some of the more pertinent features of the subject matter. These features should be construed to be merely illustrative.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION

The techniques of this disclosure are operative in a mill configuration such as described above. In one mill embodiment, the mandrel (that holds the block to be milled) rotates to expose different sides of the block to the spindle; in an alternative embodiment, the mandrel remains fixed but the mill uses two spindles mounted on opposite sides of the block for milling. The milling tools are controlled by a control system that comprises computer software executed in one or more hardware processors. As will be described, the calibration techniques of this disclosure are implemented in this software and in association with several physical components (namely, a calibration fixture, and a calibration pin) that are selectively mounted in the mill and used to facilitate the calibration process.

By way of background, the following is a description of the relevant coordinate systems with respect to the spindle-mandrel spatial relationships that are calibrated according to the techniques of this disclosure. As noted above, the basic operation of the mill is to grinds blocks (blanks) based on a given toolpath. A toolpath is a list of positions where a tip of a grinding tool needs to reside at different times. When the tool removes material and the tip follows the entire toolpath as specified, the portion of the block that remains is in a designed shape. To this end, the following coordinate systems that allow the toolpath points to be mapped into desired control system motions are defined.

Figure 1:
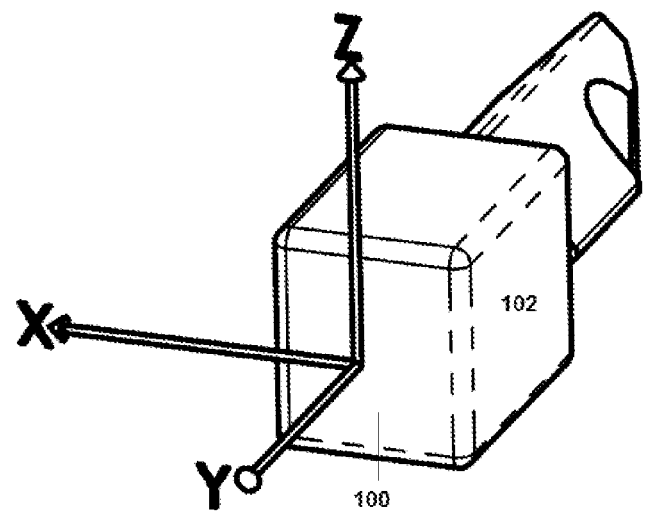
FIG. 1 depicts a representative block coordinate system.

In particular, toolpath is defined in the so-called "block" coordinate system, as shown in FIG. 1. The block coordinate system has an origin in the center of a back face 100 of the block 102, and the respective x, y and z axes are oriented as shown in FIG. 1. To be able to move the tool tip into the positions of the toolpath defined in the block coordinate system, the control system needs to know how spindle positions (e.g., as given by associated encoders) relate to the block coordinate system, as well as the length of the milling tool. Preferably, milling toolpaths preferably are defined in the block coordinate system.

Figure 2:
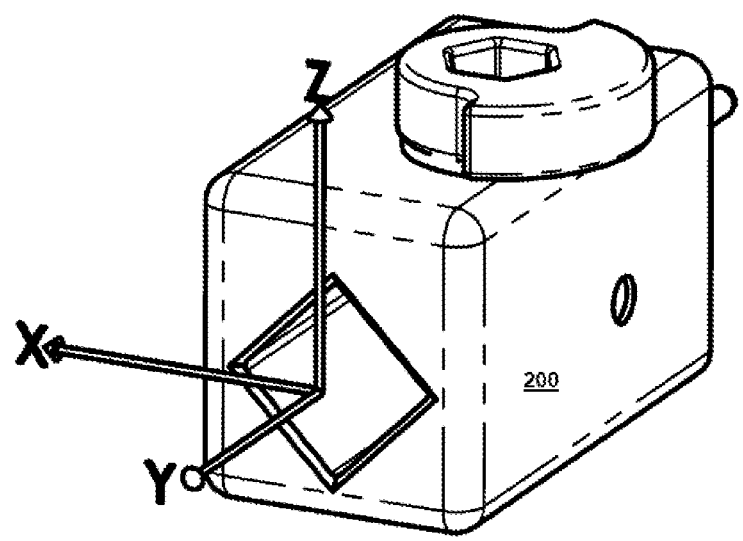
FIG. 2 depicts a representative mandrel coordinate system.

A second coordinate system is the "mandrel" coordinate system, as shown in FIG. 2. The mandrel coordinate system has an origin at an end of a mandrel holder 200, and the respective x, y and z axes of this coordinate system are aligned like in the block coordinate system (see FIG. 2). Thus, to move from block coordinate system to mandrel coordinate system, the length of the block from the y-coordinate positions of the points in block space must be subtracted.

Figure 3:
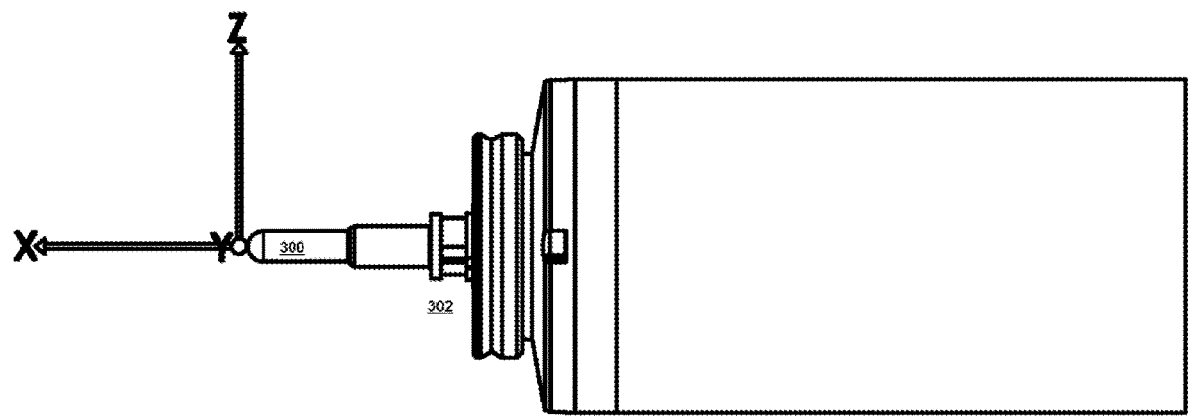
FIG. 3 depicts a representative axis coordinate system.

A third coordinate system is the "axis" coordinate system, as depicted in FIG. 3. The axis coordinate system is defined by given coordinates of the mill control system. In a typical implementation, the mill has three (3) orthogonally-assembled linear stages. The x-axis (of this coordinate system) is aligned with a spindle axis of rotation and therefore also with a milling tool 300 inserted into the spindle 302 as shown. The y-axis is aligned to go from the back of the mill towards the front of the mill, and the z-axis is aligned to go from bottom to the top of the mill. This arrangement is depicted in FIG. 3. The mill control system is only aware of these coordinates; thus tool movements are made and reported in this coordinate system. Encoders are used to track x-, y- and z-positions.

Figure 4:
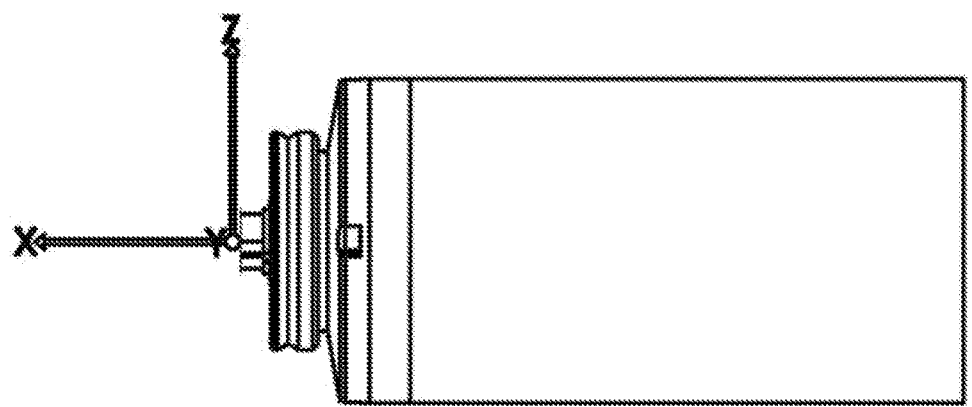
FIG. 4 depicts a representative tool coordinate system.

A fourth coordinate system is the "tool" coordinate system. The tool coordinate system is the same as the axis coordinate system described above, except that the tool coordinate system also accommodates for the length of the tool. As will be described, during calibration axis positions are subjected to the length of the tool. These points are considered to be in tool space as defined by the tool coordinate system. Thus, for example, moving the x-axis forward by the length of the tool provides axis positions with an imaginary "0-length tool." To drive the tip of the tool to any position defined in the axis coordinate system with the "0-length tool," the length of the tool is subtracted from the x-axis. This notion is shown in FIG. 4.

As noted, the calibration of spindle-mandrel relationships are essential to accurate operation of the mill and, in particular, to ensure parts of the toolpath are appropriately shared between two or more spindles, or more than one mandrel orientation. Calibration establishes mappings from one coordinate system to another. For calibration, a representative ordering of a coordinate transformation chain may then be as follows: block-to-mandrel, mandrel-to-axis, and then axis-to-tool. If a mandrel can have multiple orientations, there needs to be a separate mapping for each orientation, in which case the above-described coordinate transformation chain is re-ordered as block-to-mandrel, mandrel-to-axis (0°, 180°), and then axis-to-tool. Each of these mappings is now described in further detail.

To facilitate block-to-mandrel mapping, the control system needs information about the dimensions of the block, namely, its width, height and length. To move from block space to mandrel space (the block-to-mandrel mapping), the following mapping is used:

$$P\_Mandrel\_Space = P\_BlockSpace - (0, Block\_Length, 0)$$

where Block_Length is the dimension of the block as measured from a mandrel-block interface to a front face of the block.

Figure 5:
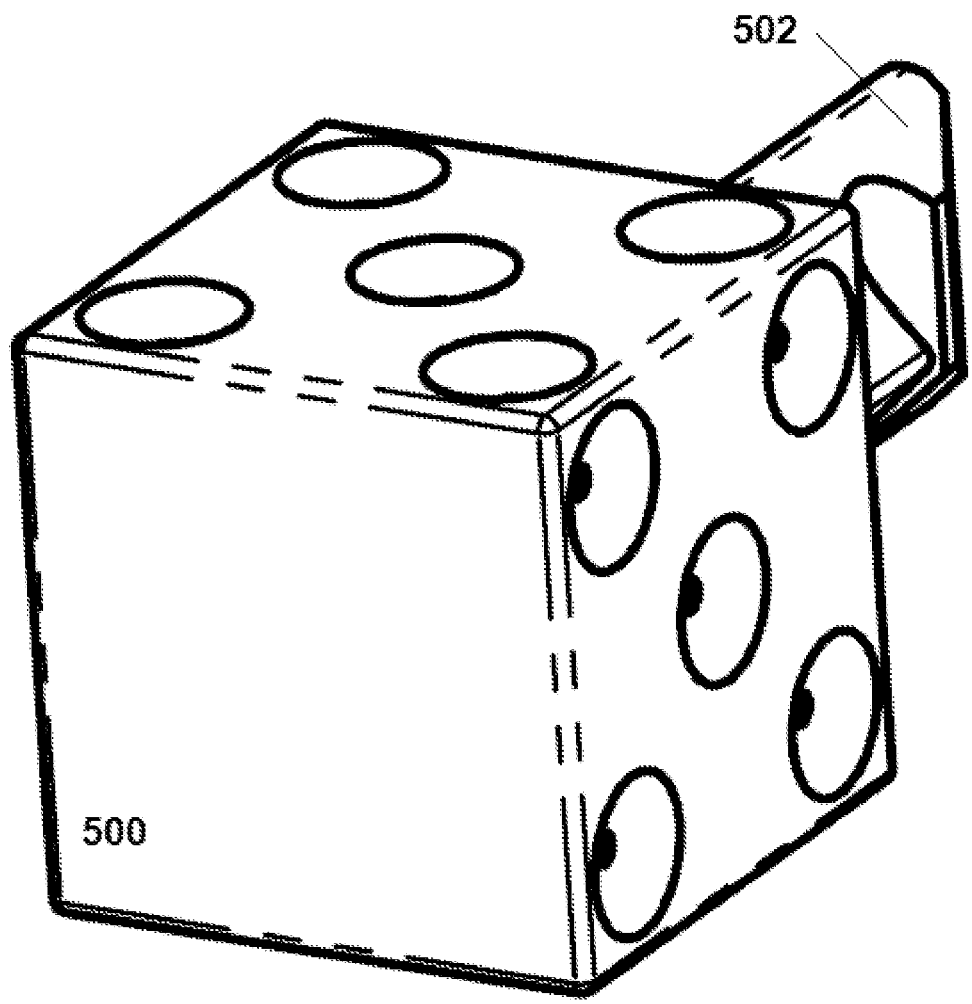
FIG. 5 depicts a preferred configuration of a calibration fixture of this disclosure.
Figure 6:
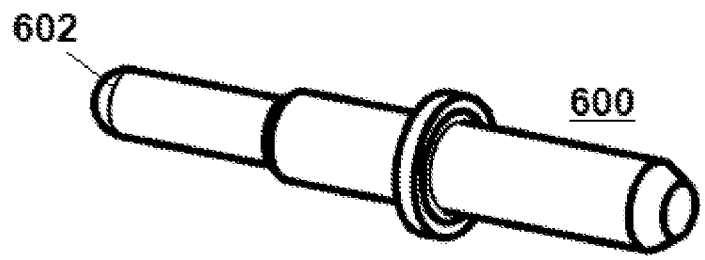
FIG. 6 depicts a preferred configuration of a calibration pin that is used together with the calibration fixture to facilitate calibration of spindle-mandrel spatial relationships according to this disclosure.

The mandrel-to-axis mapping is now described. As noted, because the mandrel can have multiple orientations with respect to a spindle, a separate mapping for each of the orientations is generated. To this end, a pair of calibration tools, i.e., a calibration fixture, and a calibration pin, are provided. As depicted in FIG. 5, preferably the calibration fixture is configured as a cube 500 secured (or otherwise affixed) to a mandrel attachment 502 (partially shown behind the cube). An associated tool, which is depicted in FIG. 6, is a calibration pin 600 that has an elongated configuration that terminates in a hemispherical tip 602 as depicted. The pin 600 has a nominal length, e.g., 19 mm.

Figure 7:
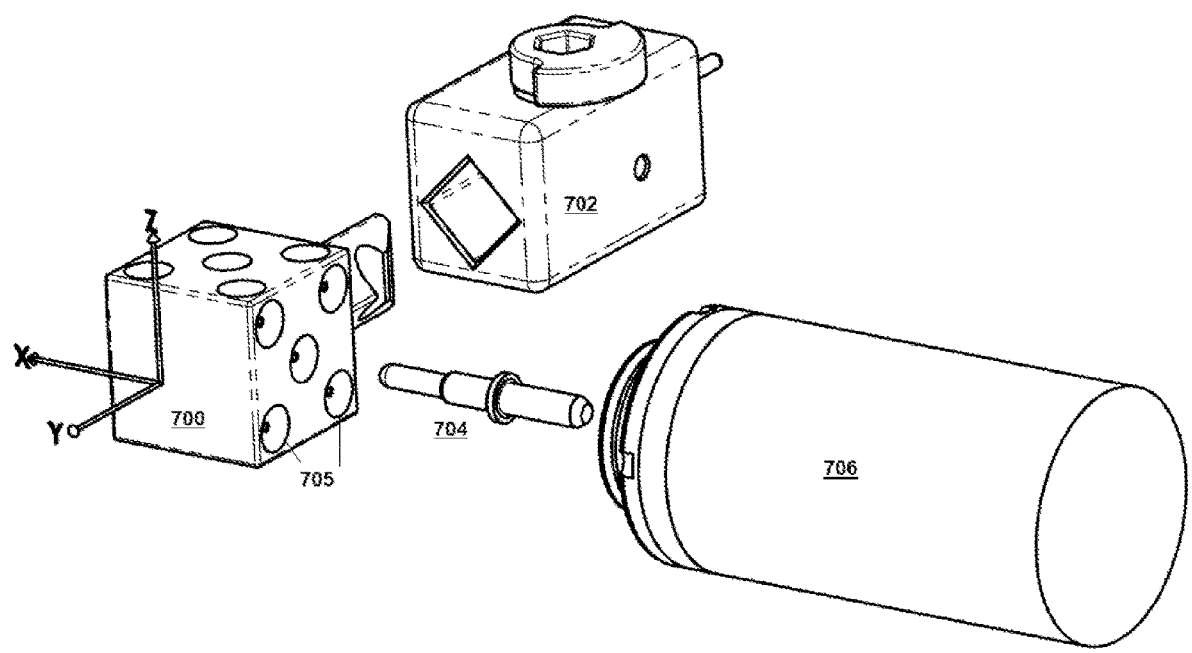
FIG. 7 depicts a 5-dimple pattern that is a preferred configuration of the calibration fixture.

With reference now to FIG. 7, to find a mapping between axis coordinates and the mandrel at some orientation, the calibration fixture 700 is inserted into the mandrel 702, and the calibration pin 704 is inserted into a collet associated with the linear drive motor 706 assembly. As further depicted in FIG. 7, and consistent with its name, the calibration fixture cube has die-like features, namely, a set of conical indentations 705 (also described as dimples or features) that are each precision milled with a drill bit (or an end mill) to a fixed depth creating a preferably 120° conical shape. Other angles and other patterns (besides conical) may be used. Preferably, the features (the conical indentations) are identical for each side of the four (4) faces of the cube. As depicted in FIG. 7, preferably these indentations (the dimples) create a shape similar to a pattern for the number "5" on a regular die. While a 5-dimple configuration is preferred, other dimple configurations may be used. Thus, for example, either a 4-dimple or even 3-dimple configuration may be used. Typically, a 3-dimple configuration is a minimum requirement as at least 3 points are required to define a plane, although even a single element may be used if it is rotationally-unique. Another alternative is to use a configuration with greater than five (5) dimples.

Using preferably an x-axis directional position error-based probing mechanism, the system registers the exact position of the five (5) dimples on the surface of the die. In particular, the calibration pin is moved slowly against the calibration fixture. As the calibration pin is moving towards the fixture, a positional error is observed within the control system. When the calibration pin is touching the fixture and cannot move forward the positional error starts to rapidly increase, and a fixed threshold is used to signal a touch point. This point is reported as a contact point for the dimple. Thus, according to this probing technique the calibration pin, which is assumed to be aligned with the spindle axis, is used to probe the features (on the calibration fixture). Preferably, the probing is repeated for each of the dimples.

The following provides additional details regarding the above-described probing operation. Once again, reference is made to FIG. 7. In particular, locating a feature starts with an initial location defined in the axis space. An assumption is made that the calibration pin 704 must hit somewhere within the cone on the surface of the calibration fixture 700. According to a preferred embodiment, a gradient descent method is used to find the deepest point of the feature being probed. In particular, the x-axis describes the depth of the calibration pin 704, and a control system-provided positional estimate with maximum x-value of the spindle is the location of the cone apex; this position specifically is a deepest part of the cone that can be accessed with the calibration pin, not necessarily the true apex).

During this process, preferably the length of the tool is compensated for by adding the nominal length to the axis coordinates that are found. As the tool is assumed to be aligned along the X-axis by adding the nominal length to X-axis, the measurements effectively collect the contact points with a virtual "0-length tool." To counter any manufacturing errors in the depths of the dimples, preferably the points are projected to the surface of the die. In the above-described manner, the system collects the axis positional coordinates of the features on the die surface facing towards the spindle.

After all features have been found in this manner, the surface of the calibration fixture is approximated, preferably by probing locations on the surface of the fixture and fitting a plane using orthogonal least squares regression. The found feature points are projected to the surface plane along the plane normal. Thus, according to this technique the exact coordinates of the calibration fixture features are acquired, preferably as defined in the mandrel coordinate system. After the calibration fixture features have been determined, a set of transformations are then generated as follows. In particular, the found features are registered in a least squares optimal way to the respective reference positions, preferably using a Singular Value Decomposition (SVD)-based point set rigid registration method. This operation associates the collected axis points and the measured mandrel coordinate system points. In particular, this method preferably creates a 4×4 homogenous matrix with 3×3 orthonormal rotational part and a translation. This method translates the two point sets into origin and finds the optimal rotations using SVD. The found transformations are then used to move from mandrel (reference space) to spindle axis coordinate system at different mandrel-spindle configurations. In particular, as the resulting 4×4 transformation has an orthonormal component and a translation component, it is invertible and thus the system can define the mandrel-to-axis mapping in both directions.

The above process is performed on all mandrel orientations that are calibrated.

The following describes the axis-to-tool mapping. As noted above, preferably the mandrel-to-axis mappings are established using a "0-length tool." To move the tool tip into the axis space, the spindle assembly is moved back by the length of the tool. This is done by redacting the length of the tool from the X-axis coordinate of the axis position, namely:

$$P\_tool = P\_Axis - (tool\ length, 0, 0)$$

As noted above, the technique of this disclosure may be used in an embodiment where the mandrel remains fixed. For a mill of this type, a similar calibration process is used except instead of rotating the mandrel (and using the calibration pin) the other spindle is used to probe the die.

A milling machine of this type typically also includes a tool changer. A representative mill of this type is described in U.S. Pat. No. 7,497,817, the disclosure of which is incorporated herein by reference. The tool changer may be calibrated in a similar fashion to the spindles. In particular, each of the three (3) tool changer parts contain dimples (features) that are similar to ones found on the mandrel calibration fixture. For tool changer calibration, reference locations are first registered to found feature points in the same manner as described in the mandrel-spindle calibration technique. Then, the tool changer slot positions, which are defined in the same space as the reference locations, are mapped to axis values using the found transformation when registering the features on the tool changer. The tool changer axis positions are now positions on the surface of the tool changer. X-values are then subtracted a constant amount to describe a delta between tool start and an optimal parking distance from the changer.

While certain aspects or features of the above-described technique have been described in the context of a computer-based method or process, this is not a limitation. Moreover, such computer-based methods may be implemented in an apparatus or system for performing the described operations, or as an adjunct to other dental restoration equipment, devices or systems. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus. The described functionality may also be implemented in firmware, in an ASIC, or in any other known or developed processor-controlled device.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic. Further, while given components of the system have been described separately, one of ordinary skill will appreciate that some of the functions may be combined or shared in given systems, machines, devices, processes, instructions, program sequences, code portions, and the like.

Other techniques may be used to detect the fixture/pin interface. Thus, for example, the system can look for electrical motor current increase instead of position error, with the sensitivity of each of these parameters being a result of using a linear motor on the spindle axis. The linear motor facilitates detection due to its direct drive configuration and the lack of additional mechanical drive train components that would otherwise add unwanted friction that would mask or reduce the sensitivity of the measured parameters.

What is claimed is as follows:

1. A method of calibrating a toolpath control system in a milling machine, the milling machine comprising a work area that includes at least one spindle to which a milling tool is attached, and a mandrel to which a block to be milled is attached, comprising:
   securing a calibration fixture in the mandrel, the calibration fixture configured as a cube and having at least one surface comprising a set of features configured in a predetermined pattern;
   probing the calibration fixture to register a position of each of the set of features on the surface;
   using information associated with the positions of the set of features to generate a set of transformations; and
   using the set of transformations to identify spindle-mandrel spatial relationships for one or more orientations of the mandrel.

2. The method as described in claim 1 wherein the predetermined pattern is a 5-dimple pattern.

3. The method as described in claim 2 wherein each feature of the 5-dimple pattern is a conical indentation milled to a fixed depth.

4. The method as described in claim 1 wherein the calibration fixture is probed by securing a calibration pin to a structure and translating the calibration pin against the calibration fixture and measuring a force feedback.

5. The method as described in claim 1 wherein probing the calibration fixture to register the position of a feature uses a gradient descent method.

6. The method as described in claim 1 wherein the set of transformations are generated using a least squares registration method.

7. The method as described in claim 6 wherein the least squares registration method uses a singular value decomposition (SVD)-based point set.

8. The method as described in claim 7 wherein a transformation has an orthonormal component and a translation component, the transformation being invertible.

9. The method as described in claim 1 wherein the calibration fixture surface has a predetermined length.

10. The method as described in claim 1 further including adjusting the information to account for variations in manufacturing tolerance of the calibration fixture.

11. An article of manufacture for use in calibrating a toolpath control system in a milling machine, the milling machine comprising a work area that includes at least one spindle to which a milling tool is attached, and a mandrel to which a block to be milled is attached, comprising:
    a calibration fixture configured as a cube and having at least one surface comprising a set of features configured in a predetermined pattern, the predetermined pattern configured as a 5-dimple pattern; and
    a calibration pin comprising an elongated body, and a tip.

12. A method of calibrating a toolpath control system in a milling machine, the milling machine comprising a work area that includes at least one spindle to which a milling tool is attached, and a mandrel to which a block to be milled is attached, comprising:
    securing a calibration fixture in the mandrel, the calibration fixture having at least one surface comprising a set of one or more features configured in a predetermined pattern;
    probing the calibration fixture to register a position of each of the set of one or more features on the surface;
    using information associated with the positions of the set of one or more features to generate a set of transformations;
    using the set of transformations to identify spindle-mandrel spatial relationships for one or more orientations of the mandrel; and
    adjusting the information to account for variations in manufacturing tolerance of the calibration fixture.

* * * * *